Aug. 31, 1965  R. E. SWEET  3,203,667
TURBINE DEVICE WITH EXHAUST OPENING PROTECTION
Filed Sept. 3, 1963

INVENTOR.
ROBERT E. SWEET
BY Robert W. Ely

United States Patent Office 3,203,667
Patented Aug. 31, 1965

3,203,667
TURBINE DEVICE WITH EXHAUST OPENING PROTECTION
Robert E. Sweet, Utica, N.Y., assignor to The Bendix Corporation, Utica, N.Y., a corporation of Delaware
Filed Sept. 3, 1963, Ser. No. 306,121
4 Claims. (Cl. 253—39)

This invention relates to turbines and more particularly concerns a turbine having, at the exhaust side of the turbine wheel, a guard which prevents tools or hands from contacting the rotating blades of the turbine.

An object of the present invention is to avoid the expensive means of attaching wire guards at the exhaust which involves the operations of milling slots into the struts and welding the wire into the slots.

Another object is to provide simple economic means for avoiding the aforenoted hazards.

An additional object is the provision of a unitized wire guard, which does not require separate fasteners, but merely geometrical recesses of the turbine exhaust structure.

Figure 1:
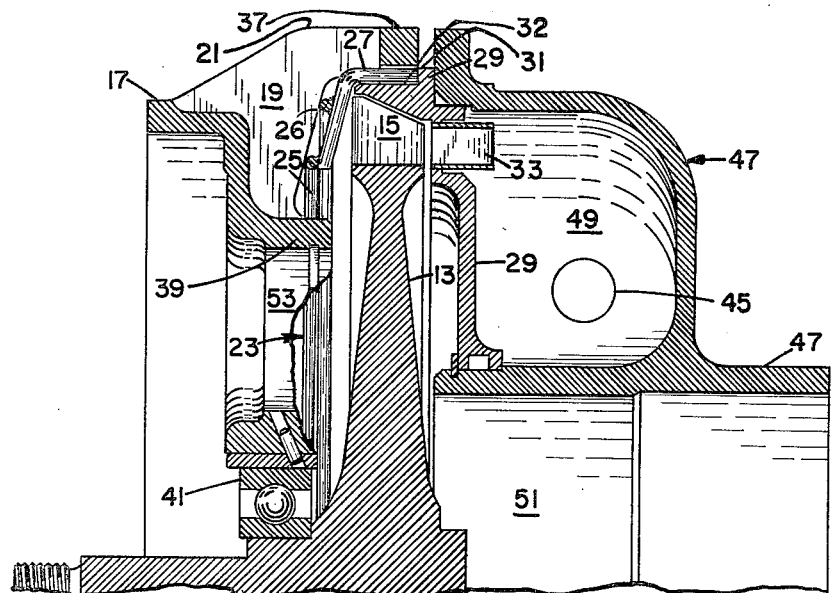
Figure 2:
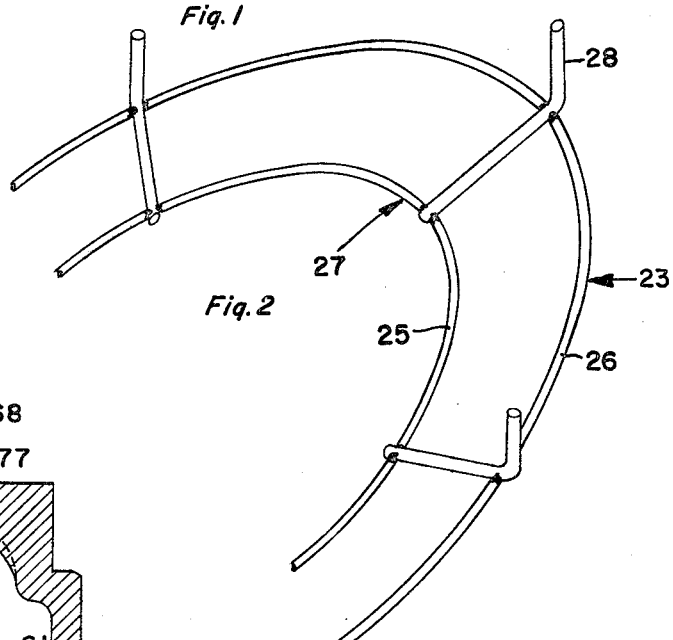
Figure 3:
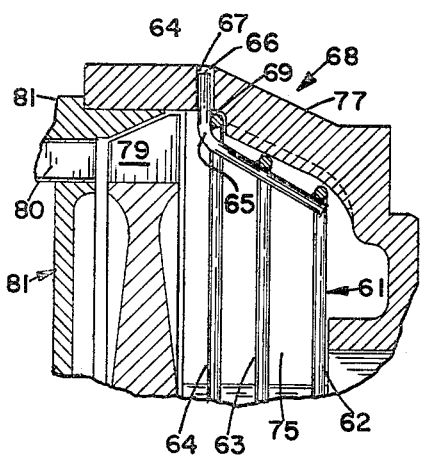

The realization of the above objects along with the features and advantages of the invention will be apparent from the following description and the accompanying drawing in which:

FIGURE 1 is a cross-section view of a pneumatic turbine starter embodying the invention and shows the fingers of unitized guard retained two housing members and blocking of exhaust ports by two concentric rings, FIGURE 2 is an isometric view of the unitized guard, FIGURE 3 is a cross-sectional view of another embodiment of the invention and shows radially-extending fingers.

Referring to FIGURE 1, a turbine device comprised of a turbine wheel 13 having blades 15 and an exhaust housing 17 having a plurality of openings 19 for exhaust gases and struts 21 between the exhaust openings. The openings 19 are of such size so that part of a hand or a tool can be inserted therethrough. The blades 15 and openings 19 are arranged so that access to said blades is provided. A unitized wire guard 23 has two axially-displaced concentric rings 25 and 26 and a plurality of equi-spaced fingers 27 which extend generally-radially though inclined slightly along the rings toward the blades 15 and terminate in axially extending projections 28.

Turbine wheel housing 29 has an upper peripheral surface 31 having recesses 32 and inclined nozzles 33 which direct the flow of gases to said blades 15. The projections 28 of the fingers 27 of the unitized wire guard 23 are mounted in the recesses 32.

Exhaust housing 17 has a ring 37 which cooperates with the turbine wheel housing 29 to firmly locate fingers 27 and hence rigidly position the guard 23. Rings 25 and 26 of wire guard 23 prevent a part of a human hand or a tool from being inserted through the equi-spaced plurality of openings 19 into contact with the turbine wheel blades 15.

It is to be noted that the inner wire ring 25 is spaced from the tubular section 39 of the exhaust housing 17 and that the outer ring 26 is similarly spaced from wheel housing 29 and almost equally spaced from the other ring 25. A bearing 41 supports the turbine wheel 13 on the inner part of exhaust housing 17. The end of the shaft 43 of wheel 13 is threaded for connection to the speed reducer of a pneumatic starter for aircraft. A plurality of openings 45 in supply housing 47 admit air or other gas to manifold 49. The wheel housing 29 is suitably mounted on the tubular projection 51 of supply housing 47. The openings 53 in exhaust housing 17 are suitably blocked to prevent passage of gases to the starter gearing (not shown).

From FIGURE 2, it is apparent how the unitized guard is adapted to be mounted in and retained in the previously-described housing structure.

In FIGURE 3, it can be seen that the other form of the unitized wire guard 61 has three axially-spaced concentric rings 62, 63, and 64 and a plurality of inclined fingers 65 having true radial attaching projections 66. These projections 66 are received in radial openings 67 of exhaust housing 68 and the outermost ring 64 is cradled on an inner shoulder 69 of housing 68 which forms a part of a larger pneumatic starter. The other two rings 63 and 64 are not similarly-cradled but are spaced slightly from the housing. Guard 61 blocks a plurality of exhaust openings 75 (one appearing) below strut 77. Blades 79 receive gas from inclined nozzles 80 mounted in wheel housing 81.

The operation of the embodiments shown in FIGURES 1 and 3 are believed apparent from the foregoing. Besides preventing damage to parts of a hand or damage to blades by tools, it is to be noted that the ease of assembly, economy of manufacture (unitized guard), and a simple firm attachment without welding (or fasteners) is provided in both embodiments by means of a finger-recess or finger-opening arrangement with shoulder cradling of the radial outer ring.

It is to be understood that persons skilled in the art can make changes in the described system without departing from the invention as set forth in the following claims.

What is claimed is:
1. A turbine device comprised of:
a turbine wheel having blades,
an exhaust housing having a plurality of openings for exhaust gases and struts between said exhaust openings,
said openings being of such size that part of a hand or a tool can be inserted therethrough,
said blades and openings being arranged so that access to said blades is provided,
a unitized guard comprised of at least one ring and a plurality of fingers,
a turbine wheel housing having recesses,
said fingers of said wheel unitized wire guard being mounted in said recesses in said housing, and
said exhaust housing cooperating with said turbine wheel housing to firmly locate said wire fingers and hence rigidly position said ring of said guard whereby a part of a human hand or a tool cannot be inserted through said openings into contact with said turbine wheel blades.

2. A turbine device comprised of:
a turbine wheel having blades,
an exhaust housing having a plurality of openings for exhaust gases and struts between said exhaust openings,
said openings being of such size so that part of a hand or a tool can be inserted therethrough,
said blades and openings being arranged so that access to said blades is provided,
a unitized wire guard comprised of at least one ring and a plurality of fingers,
a turbine wheel housing having recesses,
said fingers of said wheel unitized wire guard being mounted in said recesses in said housing, and
said exhaust housing cooperating with said turbine wheel housing to firmly locate said wire fingers and hence rigidly position said ring of said wire guard whereby a part of a human hand or a tool cannot be inserted through said openings into contact with said turbine wheel blades.

3. The turbine device according to claim 1 and being further characterized by said exhaust housing having means for receiving a projection and said unitized guard having a projection received in said last-mentioned means.

4. The turbine device according to claim 2 wherein said fingers having a projection extending generally radially or axially extends on a generally radial line or on a generally axial line.

References Cited by the Examiner

UNITED STATES PATENTS

| | | |
|---|---|---|
| 840,040 | 1/07 | Callan. |
| 2,354,761 | 8/44 | Lackenbach _____ 253—39 |
| 2,473,325 | 6/49 | Aufiero _____ 230—275 X |
| 3,135,214 | 6/64 | Johnson _____ 103—111 X |

KARL J. ALBRECHT, *Primary Examiner.*

HENRY F. RADUAZO, *Examiner.*